United States Patent
Arsenault et al.

(10) Patent No.: US 9,811,608 B2
(45) Date of Patent: Nov. 7, 2017

(54) SYSTEMS AND METHODS FOR RULE-BASED CONTENT GENERATION

(71) Applicant: 3M INNOVATIVE PROPERTIES COMPANY, St. Paul, MN (US)

(72) Inventors: Frederick J. Arsenault, Stillwater, MN (US); Brian E. Brooks, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 458 days.

(21) Appl. No.: 14/371,379

(22) PCT Filed: Jan. 10, 2013

(86) PCT No.: PCT/US2013/020999
§ 371 (c)(1),
(2) Date: Jul. 9, 2014

(87) PCT Pub. No.: WO2013/109458
PCT Pub. Date: Jul. 25, 2013

(65) Prior Publication Data
US 2014/0365876 A1    Dec. 11, 2014

Related U.S. Application Data

(60) Provisional application No. 61/586,872, filed on Jan. 16, 2012.

(51) Int. Cl.
G06F 17/30 (2006.01)
G06Q 30/02 (2012.01)
G06Q 10/00 (2012.01)

(52) U.S. Cl.
CPC ....... G06F 17/30994 (2013.01); G06Q 10/00 (2013.01); G06Q 30/0242 (2013.01)

(58) Field of Classification Search
None
See application file for complete search history.

(56) References Cited

U.S. PATENT DOCUMENTS 7,349,890 B1    3/2008  Pathak
2007/0225996 A1*  9/2007  Haberman ........ G06F 17/30017
                                                                  705/1.1

(Continued)

FOREIGN PATENT DOCUMENTS

WO    WO 2013-109457    7/2013

OTHER PUBLICATIONS

International Search Report for PCT International Application No. PCT/US2013/20999, dated Mar. 26, 2013, 2pgs.

Primary Examiner — Alan Chen
(74) Attorney, Agent, or Firm — Emily M. Van Vliet; Christina Huang

(57) ABSTRACT

At least one aspect of the present disclosure directs to a content generation system including a content generation module and a rule management module. The rule management module is adapted to receive a plurality of rules on content generation. The content generation module is adapted to generate a content configuration, wherein content configuration comprises a plurality of content elements and one or more relationships among the plurality of content elements, wherein the one or more relationships are in accordance with the plurality of rules on content generation.

12 Claims, 8 Drawing Sheets

(56) References Cited

U.S. PATENT DOCUMENTS

| | | |
|---|---|---|
| 2007/0286484 A1 | 12/2007 | Xie |
| 2009/0012847 A1 | 1/2009 | Brooks |
| 2009/0012848 A1 | 1/2009 | Brooks |
| 2009/0012927 A1 | 1/2009 | Brooks |
| 2009/0158179 A1 | 6/2009 | Brooks |
| 2009/0319555 A1* | 12/2009 | Ragno ............... G06F 17/212 |
| 2010/0017288 A1 | 1/2010 | Graham, II |
| 2010/0036828 A1* | 2/2010 | Carmel ............ G06F 17/30867 |
| | | 707/708 |
| 2010/0223221 A1 | 9/2010 | Gardner |
| 2010/0306063 A1 | 12/2010 | Wang |
| 2013/0174012 A1* | 7/2013 | Kwan ............... G06F 17/30905 |
| | | 715/234 |

* cited by examiner

SYSTEMS AND METHODS FOR RULE-BASED CONTENT GENERATION

BACKGROUND

Display content, which includes text, images, video, sounds, and other content elements, is commonly seen in public and private places. Large amounts of content are created and presented at electronic displays, such as electronic menu boards, electronic billboards, cellular phones, tablet computers, laptops, etc. Many electronic displays use content created by people, where can be highly labor intensive.

SUMMARY

At least one aspect of the present disclosure features a system comprising a rule management module and a content generation module. The rule management module is adapted to receive a plurality of rules on content generation. The content generation module is coupled to the rule management module and adapted to generate a content configuration, the content configuration comprising a plurality of content elements and one or more relationships among the plurality of content elements. The plurality of rules comprises rules on relationships and the one or more relationships in the content configuration are in accordance with the plurality of rules, the content configuration operable to be assembled to a piece of content. At least one of the plurality of content elements has more than one allowable position in the assembled piece of content.

At least one aspect of the present disclosure features a system comprising a content element repository adapted to store content elements an assembling module. The assembling module is adapted to receive a content configuration comprising a plurality of content elements and one or more relationships among the plurality of content elements. The one or more relationships are in accordance with a plurality of rules on content generation. The assembling module is further adapted to assemble a piece of content based on the content configuration by arranging the plurality of content elements according to the one or more relationships.

At least one aspect of the present disclosure features a method for content generation comprising the steps of: receiving a plurality of rules on content generation; and generating, by a processor, a content configuration comprising a plurality of content elements and one or more relationships among the plurality of content elements, the content configuration operable to be assembled to a piece of content, wherein the plurality of rules comprises rules on relationships among content elements, wherein the one or more relationships are in accordance with the plurality of rules, wherein at least one of the plurality of content elements has more than one allowable position in the assembled piece of content.

At least one aspect of the present disclosure features a method, comprising the steps of: receiving a content configuration comprising a plurality of content elements and one or more relationships among the plurality of content elements, the one or more relationships in accordance with a plurality of rules on content generation; and assembling, by a processor, a piece of content based on the content configuration by arranging the plurality of content elements according to the one or more relationships.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
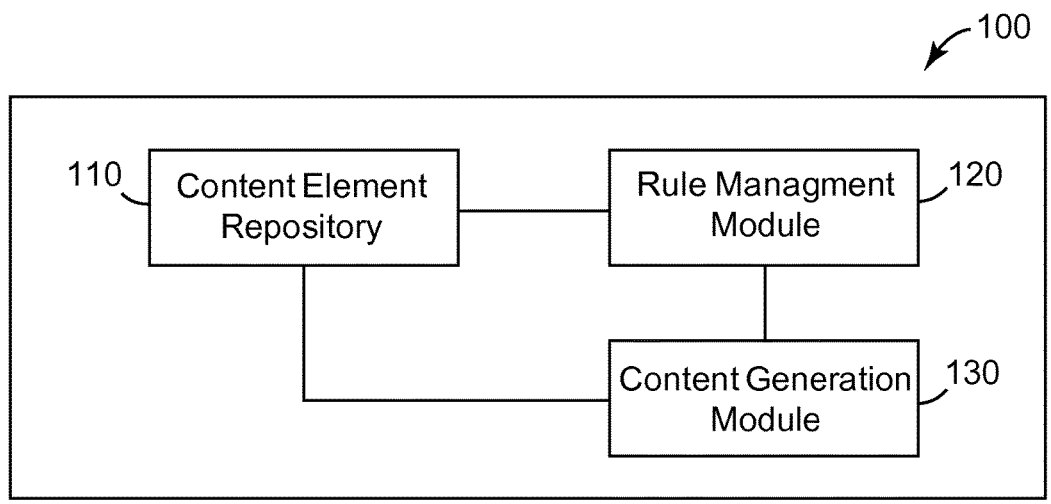
FIG. 1 illustrates an exemplary block diagram for a rule-based content generation system.

Display content presented on electronic displays is often created by people then rendered. In a system designed to optimize display content's effectiveness on influencing human behavior, a large number of pieces of content is usually needed. The approach of having content created by people often requires human input to develop each piece of content, therefore it is highly labor intensive for use in a content optimization system. For example, to optimize a display content that has 10 content elements, where each content element can be selected from a pool of 100 content elements, the number of possible content permutation can be very large, easily in excess of 1 trillion. Human involvement is often required because a machine-generated content may not be adequate for display. For example, a piece of content including a content element of a person and a content element of a sandwich, the sandwich may be placed below the person's hand instead of on the person's hand in a machine-generated content. The present disclosure is directed to systems and methods for automatic content generation based on rules of permissible relationships among content elements. The present disclosure is also directed to systems and methods for optimizing display content's effectiveness on influencing a specific behavior utilizing the rule-based content generation approach. As used herein, display content, also referred to as content, refers to multidimensional presentation on an electronic media that can include text, images, video, sound, and other content elements. For example, a piece of content can include banner advertisements for websites. Content may take many forms, including visual or aural, or any form that can impact or be detected by the human sensory system (e.g., the five senses of the human sensory system, including tactile or touch, taste, and smell, in addition to vision and hearing). Content may be static, dynamic or a combination thereof.

Metric systems for creating content are poorly suited to developing and optimizing content for consumption because human recognizes and perceives an object by its relative size, position, orientation, and other visual characteristics, but not its actual size, position, or orientation rendered in a metric system. For example, a person can perceive, by looking at a picture of the object and a house, whether the object is big by the relative sizes of the object and the house. A person cannot perceive, by looking at a picture of the object itself, whether the object is big. Additionally, metric systems lack limitations or boundaries that are meaningful to human perception. For example, a template based content generation approach limits the dimension or dimension ratio of content elements but it does not have knowledge of the content elements and cannot address relationships between content elements. As a specific example, with a content element "car" and a content element "road", a template based content generation approach may not address that the content element "car" should be placed on the content element "road" but not be placed under the content element "road". The present disclosure is directed to systems and methods that map closely to human perception to facilitate the generation and development of display content for human consumption using content elements and relationships. Specifically, embodiments of the present invention utilize an approach to generate content based on arranging content elements based on rules defining permissible categorical relationships among the content elements.

Content elements, also referred to as primitives, are subcomponents of a piece of content. For example, content elements can be geons, which are small shapes that are the basis for larger objects and images. Content elements can be more complex than individual geons. In some embodiments, content elements may include, for examples, images (i.e., two dimensional, three dimensional, etc.), diagrams, photos, video, animated images, words, phrases, or the like. In some cases, content elements may include specific compositions of more than one component, such as a specific composition of a set of geons or a specific composition of a set of images. In some other cases, content elements may include visual representations of objects, for example, a two dimensional image representation an object. In such configurations, sub-primitives are treated together as one content element for establishing categorical relationships with other content elements to create the overall configuration of a piece of content. Content elements may also include other set properties of the content, such as the background used for a two dimensional image. In yet other cases, a content element can refer to a group of content elements that is in a same category. A category can be, for example, a chicken sandwich of a particular type, a forest background, an image of a bird, an image of a blue jay, or the like.

Categorical relationships, also referred to as relationships, describe how two or more content elements are arranged in relation to one another. A configuration of content elements that can be used to render content often includes a plurality of relationships because each relationship can govern an aspect of the associations among two or more content elements. In two-dimensional visual space, for example, categorical relationships can include relative position, size, orientation, or other relationships of primitives.

Examples of categorical relationships include positional relationships, orientation relationships, color relationships, depth relationships, contrast relationships, opacity relationships, layer relationships, and size relationships. Positional relationships include, for example, one content element being above or below another content element, or to the left or right of another content element, or at other relative position with another content element. In some embodiments, positional relationships can be described by operators concerning position, such as "above( )". Orientation relationships include, for example, one content element being at acute or obtuse angles to another content element, perpendicular or parallel to another content element, and in other relative orientation of another content element. In some embodiments, orientation relationships can be described by operators concerning orientation, such as "parallel( )" or "connected( )". Size relationships can be relative size of primitives compared to one another, for example, such as being larger or smaller. In some embodiments, size relationships can be described by operators concerning size, such as "larger( )". Layer relationships include, for example, one content element is at a layer on top of a layer where the other content element is at. In some embodiments, layer relationships can be described by operators concerning orientation, such as "front( )" or "back( )".

Figure 2A:
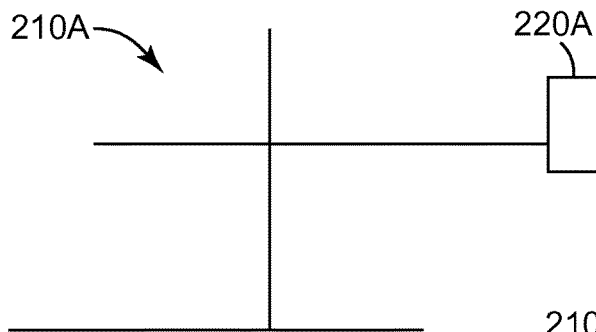
FIGS. 2A-2C are a set of simple images to illustrate positional relationship.
Figure 2B:
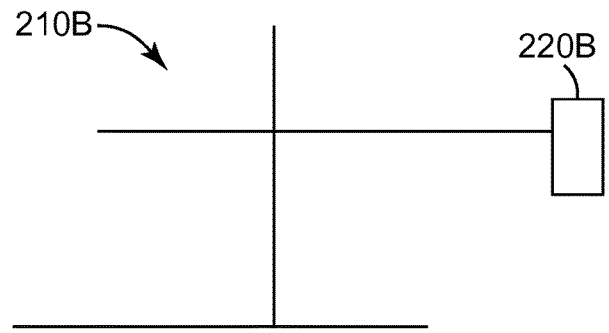
Figure 2C:
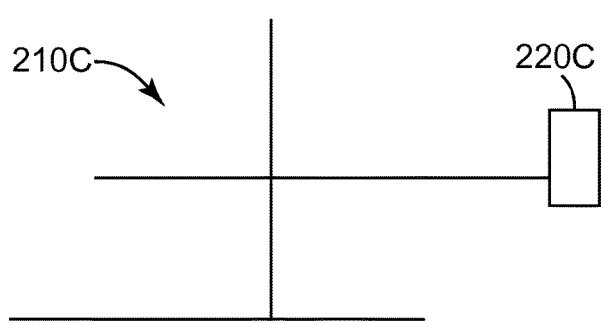

Research in vision science suggests that most types of object recognitions are largely based on categorical relationships, such as those relating to position and orientation. Differences in categorical relationships typically have larger impact to human perception than differences in coordinate systems but within categorical boundaries. FIGS. 2A-2C are a set of simple images to illustrate position relationship. FIG. 2A is a rectangle 220A at the right of a line 210A where the center of the rectangle 220A is above the line 210A. FIGS. 2B and 2C illustrate images with the same line and the same rectangle while the rectangle is moved for the same distance. More specifically, the rectangle 220B in FIG. 2B and the rectangle 220C in FIG. 2C move down the same number of pixels, where the line 210B in FIG. 2B does not move and the line 210C in FIG. 2C moves the same number of pixels. The center of the rectangle 220B in FIG. 2B is below the line 210B but the center of the rectangle 220C in FIG. 2C is above the line 210C. The categorical relationship between the line and the rectangle has changed in FIG. 2B while the categorical relationship has not been changed in FIG. 2C. While FIG. 2B has fewer changes in metric system from FIG. 2A than changes of FIG. 2C from FIG. 2B, FIG. 2C is likely to be perceived as more similar to FIG. 2A than FIG. 2B.

One of the benefits of embodiments of the present invention is that the content generation process can be automated because the generated content is in accordance with cognitive science and readily to be presented without reviewed or revised by a person. Additionally, embodiments of the present invention can help provide a flexible content generation approach, which is not limited to fixed or relatively fixed content element position. Further, embodiments of the present invention may reduce the number of permutations of content elements by generating content in conforming to rules defined and revised by the content generation system. In some embodiments, to generate a piece of content with a specific objective, possible permutations of content can be filtered by, for example, rules, permissible relationships, visual perception, and permissible content elements, or other constraints.

FIG. 1 illustrates an exemplary block diagram for a rule-based content generation system 100. The rule-based content generation system 100 can include a content element repository 110, a rule management module 120, and a content generation module 130. The content element repository 110 can provide content elements to be used in content generation. In some implementations, the content element repository 110 can provide metadata of content elements. The metadata of content elements can include, for example, content element identification, content element description, content element category, content element title, content element size information, and other information.

The rule management module 120 receives, defines, and revises rules for content generation. The rules for content generation can include, for example, rules defining relationships among content elements (i.e., rules on permissible relationships, rules on impermissible relationships, etc.), rules on content elements (i.e., rules on permissible content elements, rules excluding some content elements, rules on required content elements, etc.), and rules on metric adjustments. Rules can be defined or revised based on a number of factors, for example, such as, locality, day-part, inventory data, point-of-sale data, trigger data (data requiring a change in what content is permissible to display, i.e., a pre-determined trigger such as low inventory on a certain item, or interactive activity such as a click at a kiosk or a signal from a sensor), or the like. For example, a rule can be defined or revised that a particular content element or a particular category of content element is required or impermissible for a certain location. As another example, a rule can be defined or revised that a particular content element is impermissible when the inventory on an item represented by the particular content element is low. In some embodiments, at least some of rules are based on vision science. The content generation module 130 can generate content in accordance with rules provided by the rule management module 120 using content elements in the content element repository 110.

In some implementations, the content generation module 130 can generate content configurations that can be assembled as a piece of content. A content configuration can include content elements and categorical relationships among the content elements. As used herein, a content element is also referred to content element metadata relating to a content element, which can be used to retrieve the content element from a repository, instead of the actual content element. In a particular embodiment, for a content configuration including a plurality of content elements and one or more relationships among the plurality of content elements, at least one of content elements has more than one allowable position in accordance with the one or more categorical relationships. In some implementations, a content configuration can also include metric adjustments of the content elements, where each metric adjustment can be within a categorical relationship among two or more elements. A content configuration can be assembled to a piece of content by arranging the content elements in accordance with the categorical relationships, the piece of content is ready to be rendered on a display. A display can be any of the various types of electronic displays that are controllable by a computer or processor, for example, such as, a flat panel display, a television, a laptop, a computer screen, a projection display, a tablet computer, a cellular phone, or the like.

In some implementations, the rules for content generation can include rules on visual perception, for example, rules on relative salience of objects in a piece of content, rules on a desired saliency map of a piece of content, rules on desired saliency numbers for one or more objects in a piece of content, rules on particular orders that a viewer will likely attend to objects or regions in a piece of content, or other rules on visual perception. In some embodiments, the visual perception of a piece of content can be evaluated by a visual attention model (VAM). A visual attention model simulates neurological processes and psychological effects in a biological visual system. By applying a VAM to a piece of content, a VAM output on visual perception can be generated. The rule-based content generation system 100 can use the VAM output to determine whether an assembled piece of content satisfies the rules on visual perception. In some embodiments, if the rules on visual perception are not satisfied, the assembled piece of content may not be used.

The rule management module 120 can maintain a set of rules for content generation, which include rules on categorical relationships among content elements and/or rules on content elements. For example, a rule can be content element A is larger than content element B. As another example, a rule can be content element C is not permissible. In some implementations, the permissible content elements can be defined as a particular type of content element or other characteristics of a group of content elements. In some cases, the rule defining permissible content elements can be conditioned on some aspects related to the target display. For example, a rule can be that content type T is permissible at location L1 but content type T is not permissible at location L2. The content generation module 130 can generate a content configuration including selected content elements and relationships among the selected content elements, where the relationships are in accordance with the set of rules and the selected content elements are also in accordance with the set of rules. For a set of selected content element, content element A and content element B, and a rule defining content element A left of content element B, an exemplary content configuration generated by the content generation module 130 is illustrated in Table 1.

TABLE 1

An Example of Content Configuration
Content Configuration 1

| | |
|---|---|
| Content Elements: | Content Element A; Content Element B. |
| Relationships: | Content Element A is to the left of Content Element B; The bottom of Content Element A is above the top of Content Element B; Content Element A is larger than Content Element B. |

The present disclosure is also directed to creating and optimizing content by arranging content elements according to a set of rules defining permissible categorical relationships. A content configuration including a plurality of content elements and relationships among the plurality of content elements can be generated. A content configuration can be assembled as a piece of content by arranging the content elements in accordance with the categorical relationships. Such assembling is typically implemented by a processing unit, including but not limited to, a processor, a computer, a server, a smart phone, a tablet computer, or other computing devices. In some embodiments, a content configuration can include metric adjustments of content elements. A metric adjustment typically describes a first content element's adjustment relating to a second content element in a metric system. For example, a metric adjustment can be the first content element to be 50 pixels to the right of the second content element. As another example, a metric adjustment can be the first content element to be 5 pixels larger in the x-dimension than the second content element. As yet another example, a metric adjustment can be the first content element to be at 45° angle from the second content element. In such implementation, a metric adjustment of a first content element relating to a second content element is typically aligned with the relationship between the first content element and the second content element.

In some embodiments of a rule-based content optimization system, two content configurations of a same set of content elements that differ in a categorical relationship are designed to influence a particular behavior, if one piece of content is tested be more effective than the content assembled from the other configuration, a rule on the categorical relationship can be generated. For example, a rule can be generated that only the categorical relationship presented in the more effective content configuration is permitted. Embodiments of a rule-based content optimization system can generate and utilize contents in a search space reduced by rules defining permissible categorical relationships, as the number of content configurations can be significantly reduced. Further, embodiments of a rule-based content optimization system can optimize aspects that are significant to human perception, for examples, categorical relationships among content elements. Such embodiments can help provide rapid and meaningful testing and analysis of the effects of various content configurations on human viewers, which can lead to a quicker optimization process. Additionally, representing a piece of content with a content configuration, which may be recorded as metadata of the set of content elements and the rules defining relationships, can be used for a variety of purposes. For example, a content configuration can be used for analyzing the impact of content elements, reviewing the permissibility of relationships, assembly of content for consumption. Further, a content configuration typically requires a much less storage space than a piece of content, such that it is particular suitable for content distribution.

In some embodiments, content elements are arranged according to a set of relationships to create a piece of content. In some other embodiments, content elements can be arranged according to a set of rules on categorical relationship and metric settings to create a content configuration. In yet other embodiments, after a piece of content is optimized based on the selected content elements and a first set of rules on categorical relationships, the piece of content can be optimized according a second set of rules on metric system to improve effectiveness of the piece of content. In some implementations, optimizing content elements on metric system can be limited to an established category. For example, if a rule on a content element 'pear' and a content element 'apple' is defined as 'apple' to the left of the 'pear', a second rule can be created on how much distance between the 'apple' and the 'pear' while the 'apple' is to the left of the 'pear'. Embodiments in accordance with such implementations allow initial screening and constraints on search space such that the fine tuning in metric systems is more amenable to the optimization of content for impact on human viewers.

In some embodiments, content effectiveness of a piece of content can be collected by a rule-based content optimization system. The rule-based content optimization system typically optimizes display content in reaching optimization objectives, for example, reaching certain goals or influencing particular behaviors. The system can use the effectiveness data to optimize the piece of content to improve content effectiveness. In some cases, experiments on the piece of content can be conducted to determine effectiveness of content. In some cases, the rule-based content optimization system can define the content by content elements and categorical relationships among the content elements. In such cases, it becomes possible to analyze the effectiveness of individual aspects of a piece of content, such as content elements and categorical relationships. Additionally, the content optimization system can also associate the effectiveness of a piece of content to an individual aspect of the content, such as a content element or a categorical relationship. The association can lead to revising an existing rule or generating a new rule that can be used in the rule-based content optimization system.

In some embodiments, the rules can be defined or revised by a number of factors, for example, such as locality, inventory data, point-of-sale data, visual perception, or the like. For example, a rule can be defined that content A should be more salient than content B. As another example, a rule can be that content A is not permissible at location A while content B is permissible at location A. In some embodiments, rules can be dynamically changed by some factors, such as inventory data, trigger data, day-part, or the like. For example, a rule can be added that content A is not permissible when the inventory of the item represented in content A becomes low. As another example, a rule that content A is permissible can be changed to a rule that content A is not permissible when the day-part has changed from morning to afternoon.

In some embodiments, a content configuration can include a metric adjustment of a content element relating to another content element that is aligned with categorical relationships of the content element and the other content element in the content configuration. In such embodiments, the rule-based content optimization system can associate the effectiveness of the piece of content with metric adjustment and generate a new rule or modify an existing rule on the metric adjustment based on the effectiveness data.

Figure 3:
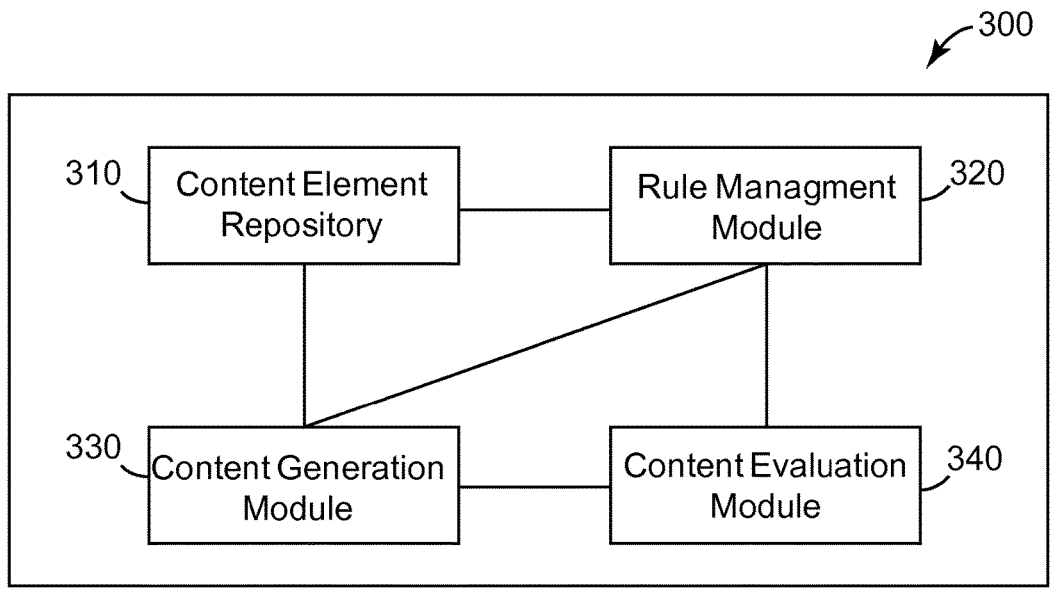
FIG. 3 illustrates an exemplary block diagram of a rule-based content optimization system.

FIG. 3 illustrates an exemplary block diagram of a rule-based content optimization system 300. The rule-based content optimization system 300 can include a content element repository 310, a rule management module 320, a content generation module 330, and a content evaluator 340. The content generation module 330 can create a content configuration including content elements and categorical relationships among the content elements, where content elements can be disposed in the content element repository 310 and the categorical relationships can be governed by a set of rules provided by the rule management module 320. The content generation module 330 can also assemble a piece of content according to a content configuration. In some embodiments, the content generation module 330 can be implemented by one processing unit. In some other embodiments, the content generation module 330 can be implemented by more than one processing units. For example, the content generation module 330 can include one or more processors to generate content configurations and some other processor(s) to assemble the content configurations to pieces of content. The content evaluator 340 can evaluate content effectiveness of the piece of content assembled by the content generation module 330.

Based on the content effectiveness data gathered by the content evaluator 340, the rule management module 320 can revise the set of rules to create content with improved effectiveness. More specifically, if two content configurations differing in an aspect of configuration, for example, a content element or a relationship, and the two content configurations are different in content effectiveness based on data collected by the content evaluator 340, the rule management module 320 can revise the set of rules governing the content generation to incorporate the aspect of configuration that is part of the content configuration having higher effectiveness. The rule management module 320 can revise the set of rule governing a content optimization in a number of ways, for example, creating a new rule, revising an existing rule, adjusting a weight factor of a parameter, or other approaches. In some embodiments, the rule management module 320 can revise the set of rule by adding a rule on a relationship, modifying a rule on a relationship, adding a rule on a content element, modifying a rule on a content element, adding a rule on a metric adjustment, or modifying a rule on a metric adjustment.

Systems and methods in the present disclosure can utilize experimental design principles to determine effectiveness of a piece of content. In some embodiments, the content evaluator 340 can conduct experiments to gather data to determine the effectiveness of a piece of content. The experiments conducted by the content evaluator 340 can be, for example, correlational designs, quasi-experiments, true experiments, or the like.

Embodiments of the present invention can be used to generate content and/or optimize content on internet. Embodiments of the present invention can also be used to generate content and/or optimize content on digital signage networks. Digital signage networks, typically including many displays, can be controlled electronically by one or more computers or processors. Various aspects of experimental design are disclosed in details in commonly assigned U.S. Patent Application Publication No. 2010/0017288, entitled "Systems and Methods for Designing Experiments," U.S. Patent Application Publication No. 2009/0012848, entitled "System and Method for Generating Time-slot Samples to Which Content May be Assigned for Measuring Effects of the Assigned Content," U.S. Patent Application Publication No. 2009/0012927, entitled "System and Method for Assigning Pieces of Content to Time-slots Samples for Measuring Effects of the Assigned Content," and U.S. Patent Application Publication No. 2009/0012847, entitled "System and Method for Assessing Effectiveness of Communication Content," which are incorporated herein by reference in entirety.

Figure 4A:
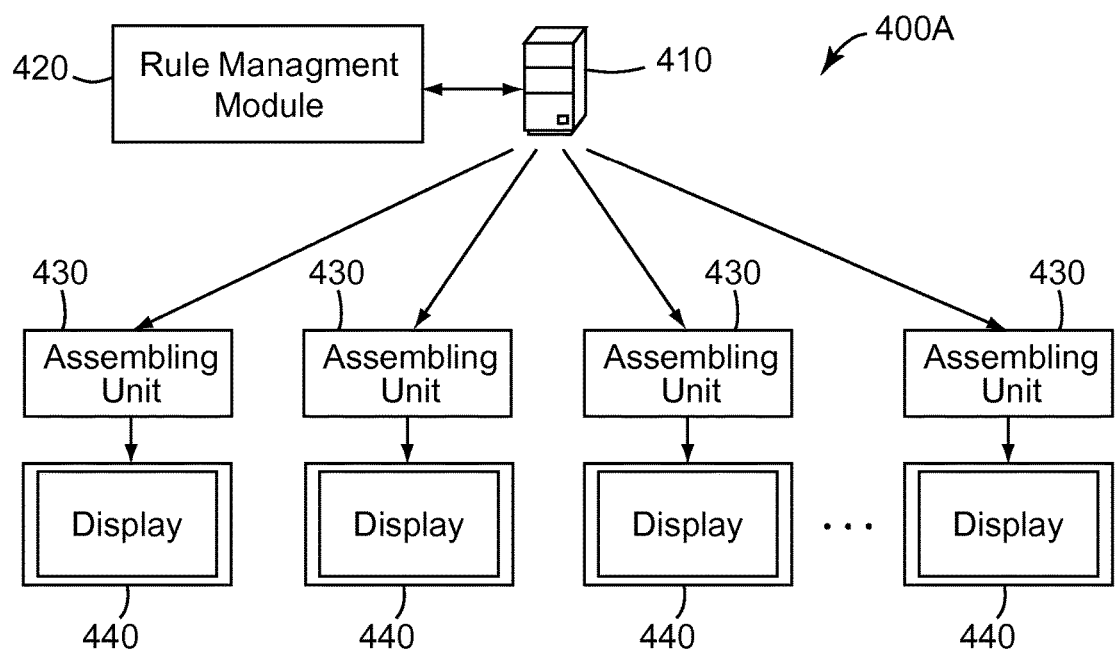
FIGS. 4A and 4B illustrate system diagrams for exemplary embodiments of a rule-based content generation system.

FIG. 4A illustrates a system diagram for an exemplary embodiment of a rule-based content generation system 400. The rule-based content generation system 400 includes a content generation module 410, a rule management module 420, one or more assembling units 430, and optionally one or more displays 440. Various components of the rule-based content generation system 400 can be implemented by one or more computing devices, including but not limited to, circuits, a computer, a processor, a processing unit, a microprocessor, and/or a tablet computer. In some cases, various components of the rule-based content generation system 400 can be implemented on a shared computing device. Alternatively, a component of the system 400 can be implemented on multiple computing devices. In some implementations, various modules and components of the rule-based content generation system 400 can be implemented as software, hardware, firmware, or a combination thereof. In some cases, various components of the rule-based content generation system 400 can be implemented in software or firmware executed by a computing device. The rule management module 420 manages rules that govern content creation. The rules for content creation can include, for example, rules on relationships among content elements (i.e., rules defining permissible relationships, rules defining impermissible relationships, etc.), rules on content elements (i.e., rules defining permissible content elements, rules defining required content elements, rules excluding some content elements, etc.), and rules on metric adjustment. The content generation module 410 can be implemented on one or more processing units. The rule management module 420 and the content generation module 410 can reside on a same computer or a different computer. In some embodiments, the content generation module 410 can generate content configurations specifying composing content elements and relationships among the composing content elements in accordance with rules provided by the rule management module 420.

In some embodiments, content configurations are transmitted from the content generation module 410 to the one or more assembling units 430. The assembling units 430 can create pieces of content by arranging content elements in accordance with relationships among the content elements, where both the content elements and the relationships are specified by content configurations. In some implementations, the assembling units 430 can create pieces of content suitable to target displays. For example, the assembling units 430 can create pieces of content based on characteristics of target displays, for example, such as aspect ratio, resolutions, or the like. In some implementations, the assembling units 430 can retrieve content elements from a central content element repository or a local content element repository (both not shown in FIG. 4). The assembling units 430 can further provide the created content to the displays 440. In some implementations, an assembling unit 430 can provide content to more than one display 440.

In some implementations, the content generation module 410 can be implemented on computing devices that are co-located with the assembling units 430. In some cases, the content generation module 410 can be on a same computing device as the assembling unit 430 at a location. In some other cases, the rule management module 420 can be implemented on computing devices that are co-located with the assembling units 430. In some cases, the rule management module 420 can be on a same computing device as the assembling unit 430 at a location.

Figure 4B:
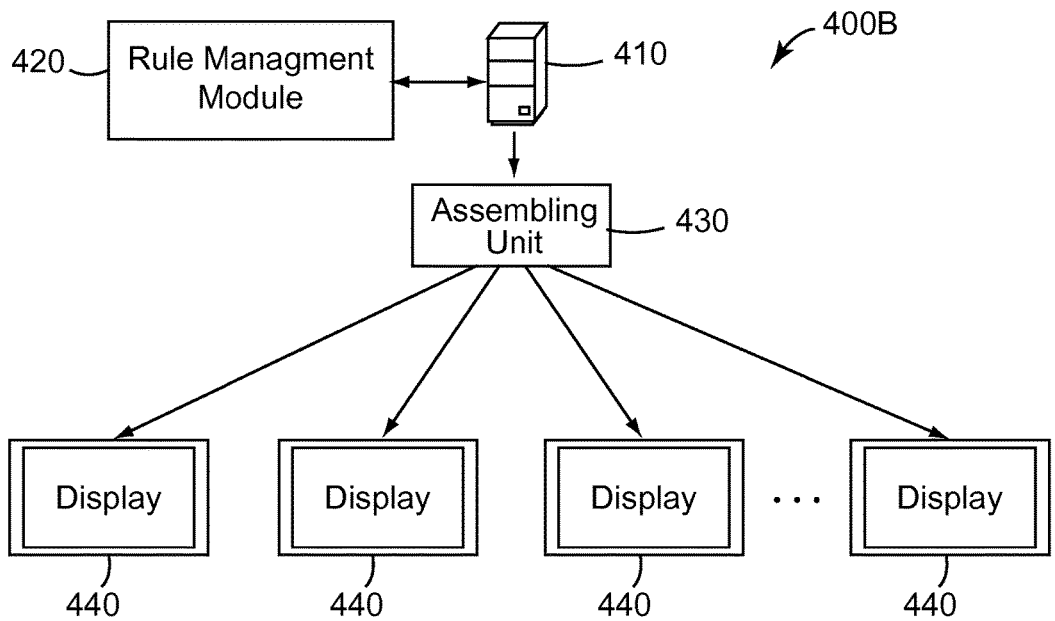

FIG. 4B illustrates a system diagram for another exemplary embodiment of a rule-based content generation system 400B. The content generation system 400B can include one or more assembling units 430 at central servers or local servers that are remote from the displays 440. This implementation can be suitable for an internet based application, where pieces of content can be assembled by the assembling unit 430 at an internet server.

Figure 5A:
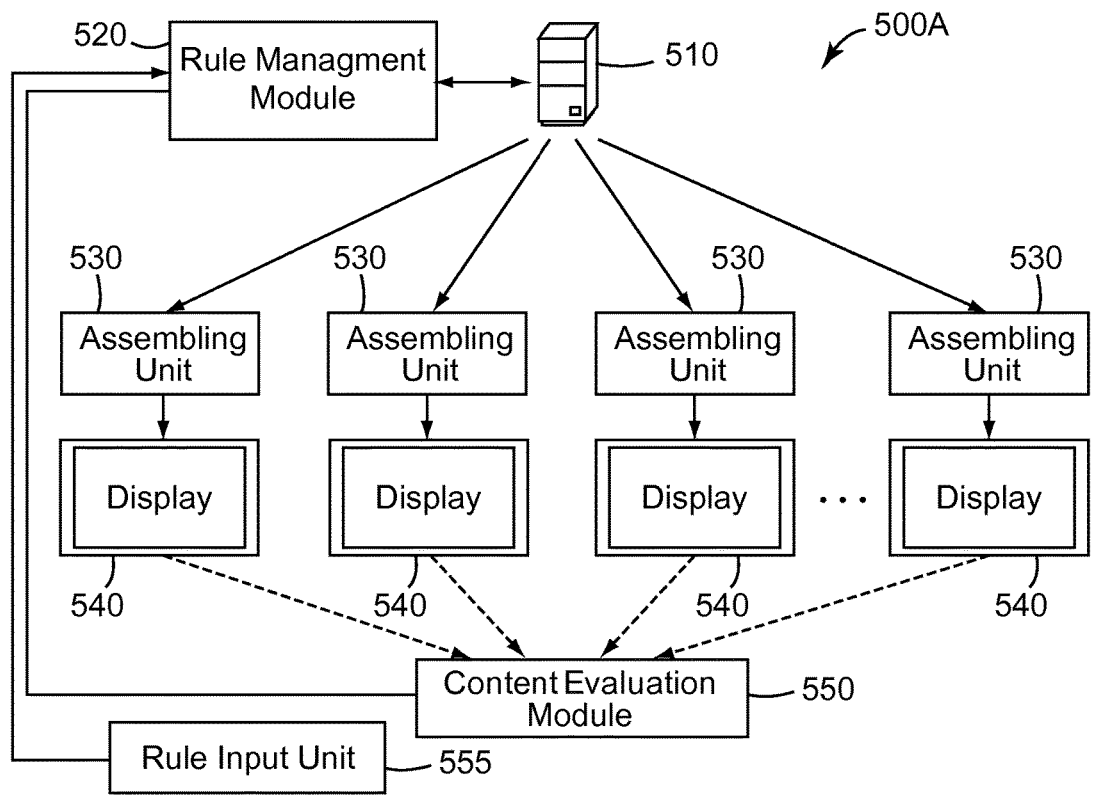
FIGS. 5A and 5B illustrate system diagrams for exemplary embodiments of a rule-based content optimization system.

FIG. 5A illustrates a system diagram for an exemplary embodiment of a rule-based content optimization system 500. The rule-based content optimization system 500 includes a content generation module 510, a rule management module 520, optionally one or more assembling units 530, optionally one or more displays 540, a content evaluator 550, and optionally a rule input unit 555. The rule management module 520 manages rules that govern content creation. The rules for content creation include, for example, rules on relationships among content elements, rules on content elements, and rules on metric adjustment. The content generation module 510 can be implemented on one or more processing units. The rule management module 520 and the content generation module 510 can reside on a same computer or a different computer. In some embodiments, the content generation module 510 can generate content configurations specifying composing content elements and relationships among the composing content elements in accordance with rules provided by the rule management module 520. Various components of the rule-based content optimization system 500 can be implemented by one or more computing devices, including but not limited to, circuits, a computer, a processor, a processing unit, a microprocessor, and/or a tablet computer. In some cases, various components of the rule-based content optimization system 500 can be implemented on a shared computing device. Alternatively, a component of the system 500 can be implemented on multiple computing devices. In some implementations, various modules and components of the rule-based content optimization system 500 can be implemented as software, hardware, firmware, or a combination thereof. In some cases, various components of the rule-based content optimization system 500 can be implemented in software or firmware executed by a computing device.

In some embodiments, content configurations are transmitted from the content generation module 510 to the one or more assembling units 530. The assembling units 530 can create a piece of content by arranging content elements in accordance with relationships among the content elements, where both the content elements and the relationships are specified by a content configuration. The assembling units 530 can further provide the created content to the displays 540. In some implementations, the assembling unit 530 can provide content to more than one displays 540. In some embodiments, the assembling unit 530 can be implemented on computing devices co-located with the display 540. In such implementations, network traffic can be significantly reduced as only content configurations not the actual assembled pieces of content are transferred through the network.

In some implementations, the content generation module 510 can be implemented on computing devices that are co-located with the displays 540. In some cases, the content generation module 510 and the assembling unit 530 can be implemented on a same computing device. In some other implementations, the rule management module 520 can also be implemented on computing devices that are co-located with the displays 540. In some cases, the rule management module 520 and the assembling unit 530 can be implemented on a same computing device.

The content evaluator 550 can evaluate the effectiveness of pieces of content. A content configuration, corresponding to a piece of content, can be designed to influence a particular behavior. For example, an advertisement can be designed to promote sales of a product. The content evaluator 550 can collect data indicative of activities when the content is displayed to evaluate the effectiveness of the piece of content. Using the example above, the content evaluator 550 can collect point of sales data for the product to evaluate the effectiveness of the advertisement on promoting sales.

In some embodiments, the rule management module 520 can maintain a set of rules governing generation of content that is designed to influence a particular behavior. A first content configuration and a second content configuration are generated in accordance with this set of rules. The content evaluator 550 can compare the two content configurations and effectiveness of the two pieces of content assembled from the two content configurations. The content evaluator 550 can generate an effectiveness evaluation corresponding to one or more aspects of content configurations and provide the evaluation to the rule management module 520. The rule management module 520 can modify the set of rules governing generation of content that is designed to influence the particular behavior. The optional rule input unit 555 can provide rule related factors (i.e., inventory data, locality, saliency, etc.) to the rule management module 520 to modify the set of rules.

Figure 5B:
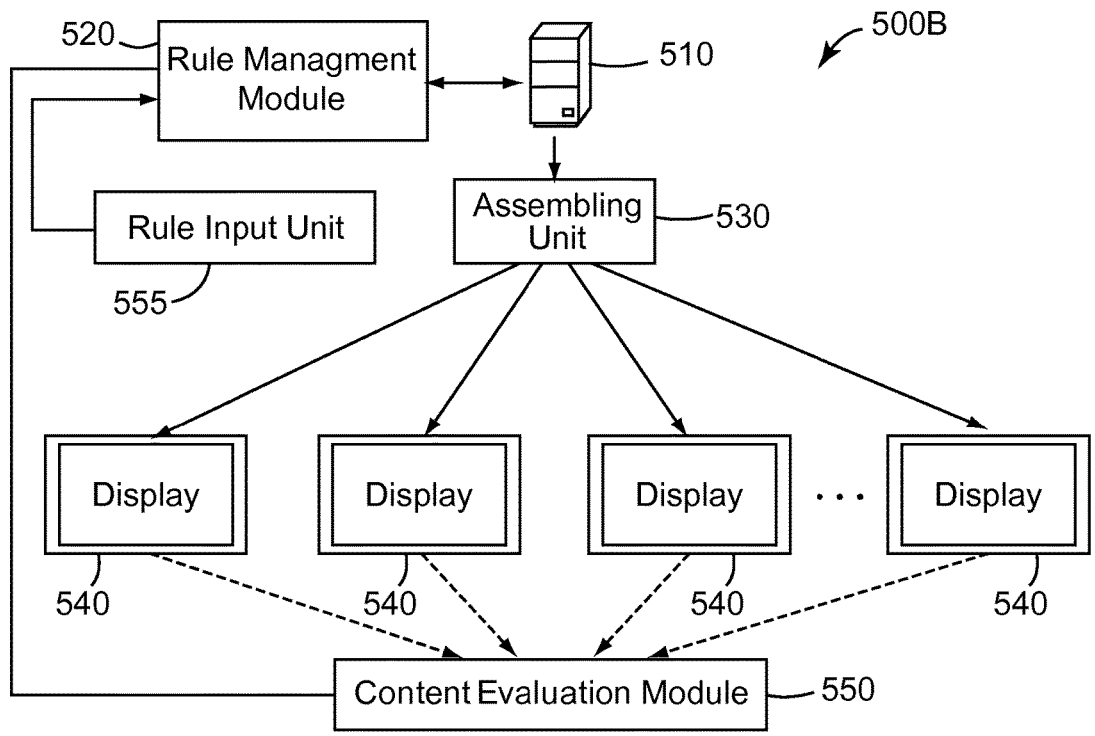

FIG. 5B illustrates a system diagram for another exemplary embodiment of a rule-based content optimization system 500B. In some implementations, the assembling unit 530 can be implemented on one or more central servers or local servers that are remote from the displays. This implementation can be suitable for an internet based application, where pieces of content can be assembled by the assembling unit 530 at an internet server.

Figure 6:
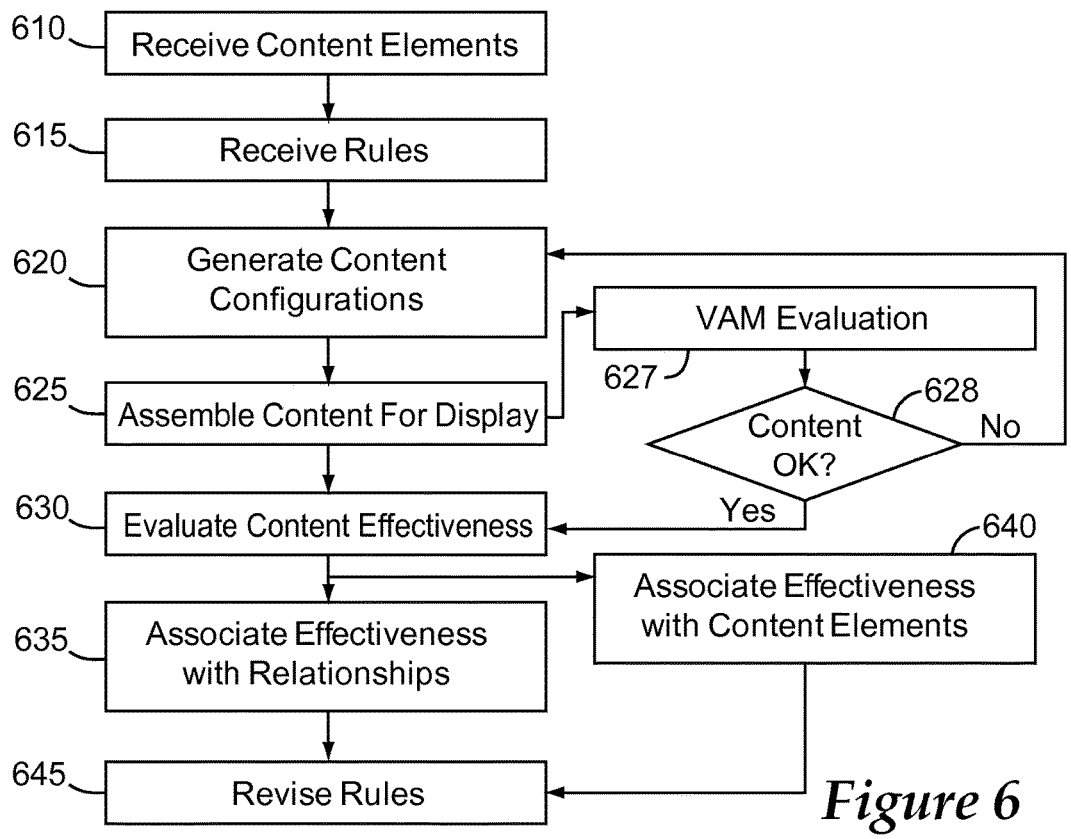
FIG. 6 illustrates an exemplary logical flowchart of a rule-based content optimization system.

FIG. 6 illustrates an exemplary logical flowchart of a rule-based content optimization system. The rule-based content optimization system typically optimizes display content in reaching optimization objectives, for example, reaching certain goals or influencing particular behaviors. First, content elements are received (step 610). The content elements may include specific geons, individual images, a group of images, or other specific pieces that are susceptible to assembly into a piece of content. In some embodiments, the content elements can be retrieved from a data repository or received from, for example, user input, network input, or other sources. These content elements can be a set of selected content elements suitable for generating content suitable in reaching the optimization objectives. A set of rules governing content generation are received (step 615). These rules include rules defining permissible categorical relationships among content elements, rules on content elements, and, optionally, further include rules on metric adjustments within those categorical relationships. In some embodiments, these rules may include rules on what consist of permissible content elements. These rules can be retrieved from a data repository or received from, for example, user input, computing device, or other sources. The set of rules can be defined toward reaching the optimization objectives. When the content elements and the rules have been received, content configurations can be generated (step 620), by arranging some or all of the content elements in a manner that is consistent with the rules. The generated content configurations can be assembled to pieces of content for display (step 625) by assembling the content elements in accordance with the relationships and any other adjustments as specified in the content configurations. In some implementations, the content configurations can be assembled to different pieces of content that are suitable for the target displays. In some embodiments, optionally, the assembled pieces of content can be evaluated by a visual attention model (VAM) (step 627) and the result of the evaluation can be used to determined whether the assembled pieces of content satisfy rules related to visual perception (step 628). For example, whether the relative saliency of items represented in the content satisfied the rules. As a specific example, a rule can be that item A should have higher saliency (i.e., more likely to be attended) than item B. If the assembled pieces of content satisfy rules related to visual perception, the pieces of content can be rendered for display. Otherwise, the system will route back to generate content configurations (step 620).

The content effectiveness in reaching the optimization objectives can be evaluated when the pieces of content are rendered for display (step 630). The content evaluation may include the step of, for example, designing a playlist for the content to be displayed, defining percentages of play for different pieces of content, or other means of regulating the content to which viewers will be exposed over time. The results of the experiments can be used to evaluate the effectiveness of the content. In some embodiments, the content effectiveness can be evaluated when playing these pieces of content in an experiment designed in accordance with experiment design principles. The experiment may be, for example, a correlational design, a quasi-experiment or a true experiment. In some embodiments, the experiment can be performed in a manner that reduces carryover effects.

The effectiveness data can be used to associate effectiveness with one or more content elements (step 635) and/or to relationships among elements (step 640). These associations can be made by comparing content performance and determining what differences can be attributed to variations in selection of content elements or the relationships among those elements. With that effectiveness information, the rule-based content optimization system may optionally include a further step of revising the rules (step 650). The revision of the rules can create or update a rule of, for example, removing low-performing content elements, creating or revising permissible relationships. The revision of the rules can help optimize content generated in later iterations toward reaching the optimization objectives.

Figure 7:
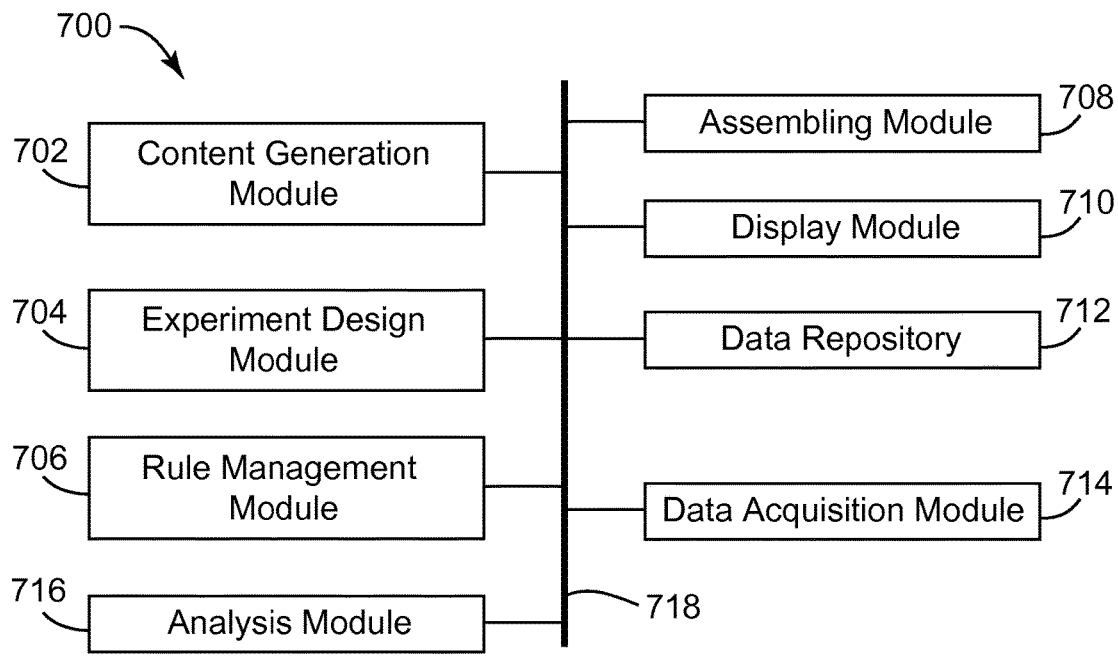
FIG. 7 illustrates a modular diagram of an exemplary embodiment of a rule-based content optimization system.

FIG. 7 illustrates a modular diagram of an exemplary embodiment of a rule-based content optimization system 700. In the embodiments illustrated in FIG. 7, the rule-based content optimization system 700 can include a content generation module 702, a experiment design module 704, a rule management module 706, an assembling module 708, a display module 710, a data repository 712, a data acquisition module 714, an analysis module 716, and a communication interface 718. The content generation module 702 is configured to create configurations of content elements and relationships among content elements. The content generation module 702 can generate the content configurations in accordance with rules provided by the rule management module 706. An experiment design module 704 is configured to design an experiment to evaluate content performance. The experiment design module 704 can create schedules and playlists that control content display so that content performance may be measured through a correlational design, quasi-experiment or true experiment.

The assembling module 708 can receive content configurations of content elements and relationships and process those configurations to create a piece of content in a format suitable for play on a display. This may include assembly of content from content elements and relationships into an image file in a known format, such as .jpeg or other image formats, or creation of video in appropriate known formats such as .swf or .mpeg formats by assembling reference points and applying transitions governing permissible changes of content elements and relationships over time between the reference points to fill in the frames between reference points.

The display module 710 allows rendered content to be presented to viewers. In some embodiments, the display module 710 includes a plurality of digital displays. In some cases, the display module 710 can include displays dispersed at multiple locations.

In some embodiments, the data acquisition module 714 is configured to measure or collect data indicative of activities during the experiment. The data acquisition module 714 may perform or facilitate acquisition of data via any method. For example, the data acquisition module 714 may be coupled to various sensor or data acquisition devices that gather information including product movement, product sales, customer actions or reactions, and/or other information. Sensors may be used to detect, for example, if a customer picks up the product, or if a customer is in the vicinity of the display when the content is displayed. Sales may be determined based on information acquired by a point of sales (POS) system. One or more devices that validate the display of content may also be used. Changes in inventory levels of a product may be available via an inventory control system. Customer reactions may be acquired via questionnaires. One or more types of data collected by the data acquisition module 714 can be used to evaluate content performance.

Content performance data can be evaluated by the analysis module 716 to allow for the attribution of content effectiveness to particular relationships or content elements. Content performance data can be, for example, data indicative of activities at a site, data indicative of view behavior, results from visual attention models (i.e., salience maps, progressions of attention through the content over time, etc.). Content performance data may show that among two types of content where the only difference is the selection of one content element, the optimization system may attribute the difference in performance among those two elements to the different content elements selected. In some embodiments, the optimization system can use data from multiple pieces of content, attribute differences in performance to specific elements of the pieces of content by analyzing matrixes of the differences among the multiple pieces of content.

The rule management module 706 can receive, create, and modify rules for content creation. For example, the rule management module 706 may modify the rules to eliminate less-effective variants of specific content by restricting the content elements that can be used, or by restricting the set of permissible relationships among specific elements or types of elements. The rule management module 706 may also receive or create rules, for example, rules defined through a user interface. The rule management module 706 is discussed further below.

One or more modules of the rule-based content optimization system 700 can be implemented on a same computing device or several computing devices. Each module of the rule-based content optimization system 700 can be implemented on an array of computing device. For example, the assembling module 708 may include a plurality of computers dispersed at multiple locations where displays are located. As another example, the assembling module 708 may include a computing device controlling a plurality of displays at one location or at multiple locations. One or more modules of the rule-based content optimization system 700 can be co-located or remotely located. For example, the assembling module 708, the display module 710, and the data acquisition module 714 may be co-located. In some embodiments, the content generation module, the analysis unit, and the experimental design module may be co-located. The assembling module 708 may, in some embodiments, be located with the content generation module 702, but preferably is located with one or more displays of the display module 710.

The communication interface 718 can provide electronic communication among the components of the rule-based content optimization system 700. The communication interface 718 can include both short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface 718 may be either within a private computer network, such as intranet, or on a public computer network, such as the internet.

Data repository 712 provides data storage for the rule-based content optimization system 700. The data repository 712 can provide data storage for one or more modules in the rule-based content optimization system 700. In some cases, the data repository 712 may run on a single computer or storage device. In some other cases, the data repository 712 may run on a series of networked computers, servers, or devices. In some implementations, the data repository 712 includes tiers of data storage devices including local, regional, and central. In some embodiments, the data repository 712 can provide data storage for the content generation module 702 and/or the rule management module 706 to store data, for example, such as content elements, metadata of content elements, rules governing content generation, relationships among content elements, and the like. In some embodiments, the data repository 712 provides data storage for the data acquisition module 714 and/or analysis module 716 to store data, for example, for example, such as data collected by the data acquisition module 714, the content performance data, and the like.

The data repository 712 may be any non-transitory computer readable medium. For example, it may be random access memory, a flat file, a XML file, or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository 712, for example, may be a single relational database such as SQL Server from Microsoft Corporation. In some cases, the data repository 712 may include a plurality of databases that can exchange and aggregate data by data integration process or software application. In an exemplary embodiment, part of the data repository 712 may be hosted in a cloud data center.

Figure 8:
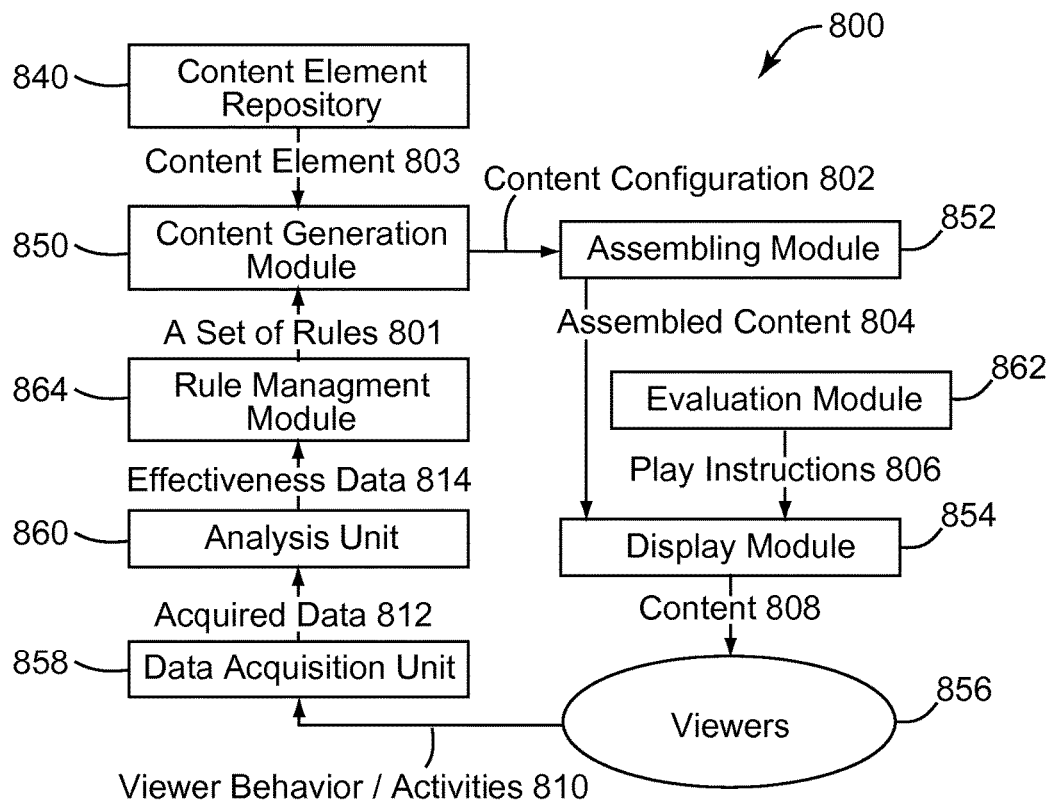
FIG. 8 illustrates an exemplary data flow diagram of a rule-based content optimization system.

FIG. 8 illustrates an exemplary data flow diagram of a rule-based content optimization system 800. In this embodiment, the rule-based content optimization system includes a content element repository 840, a content generation module 850, an assembling module 852, a display module 854, a data acquisition unit 858, an analysis unit 860, an evaluation module 862, and a rule management module 864. The content generation module (850), based on a set of rules 801 provided by the rule management module 864, generates a content configuration 802, which includes a selection of content elements, the categorical relationships among those selected content elements, and optionally, metric adjustments to the categorical relationships. This content configuration 802 is received by the assembling module 852, which arranges the selected content elements according to the content configuration, and creates an assembled piece of content 804 in a format appropriate for display. The evaluation module 862 generates a set of play instructions 806 of the piece of content to allow the performance of the piece of content to be measured. In some embodiments, this set of play instructions 806 is transferred to the display module 854 to govern the display content 808 to viewers 856 in a manner that carries out a correlational design, a quasi-experiment, a true experiment, or other performance measurement scheme. Assembled content 804 is presented on one or more displays in the display module 854 and presented to viewers in accordance with the play instructions 806. Viewer behavior and/or content effects 810, such as purchase decisions, movement among areas, visual effects, or other data potentially driven by content are captured or collected by the data acquisition unit 858. This acquired data 812 is transmitted to the analysis unit 860, in order to assess the effectiveness of content. The analysis unit 860 can transform the acquired data 812 into effectiveness data 814 by examining the differences in content configurations (e.g. the use of different content elements or differences in the relationships among those content elements). The effectiveness data 814 is received by the rule management module 864 to revise the set of rules 801 in further iterations of creating and testing content. Optionally, other rule factors 816 (i.e., inventory data, locality, visual perception, etc.) can be input to the rule management module 864 to revise the set of rules 801.

Figure 9A:
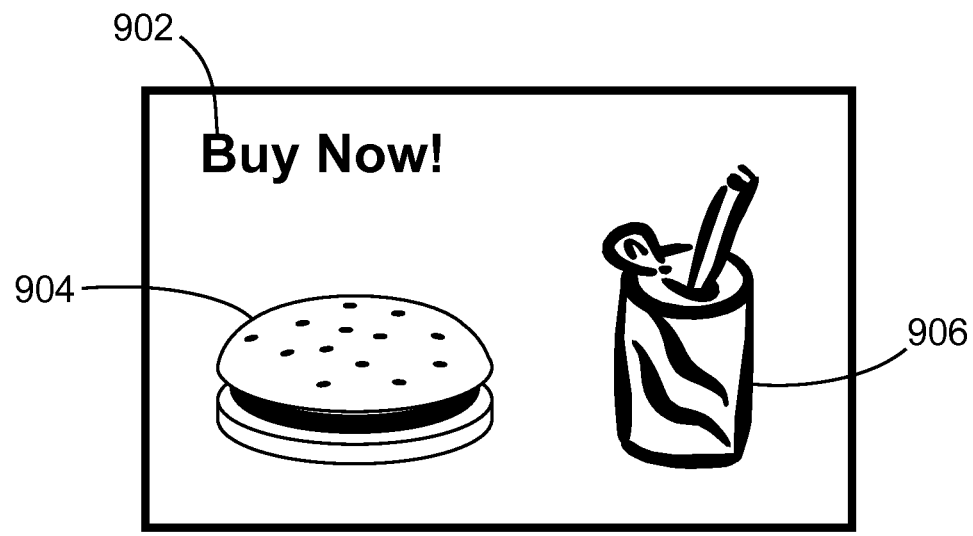
FIGS. 9A and 9B illustrate two pieces of content created by a rule-based content optimization system with the optimization objectives of selling hamburgers.
Figure 9B:
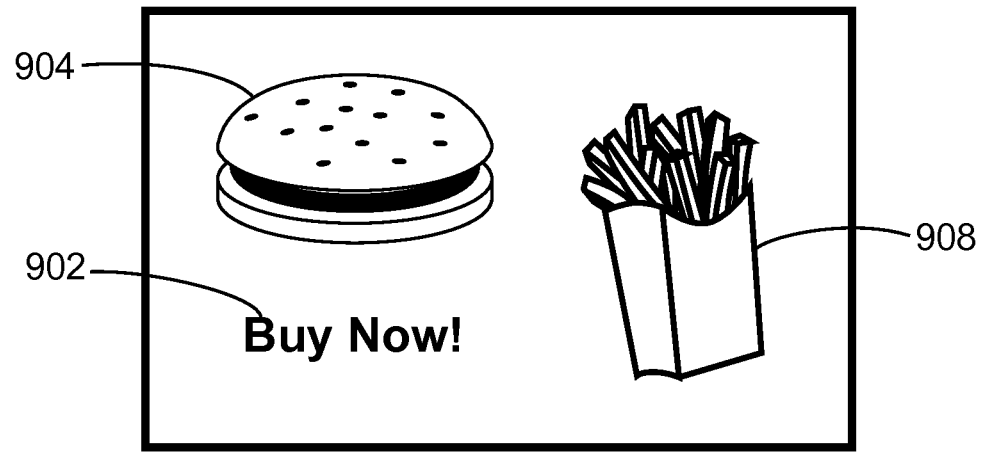

FIGS. 9A and 9B illustrate two pieces of content, to be displayed on a display device, created by a rule-based content generation/optimization system with the optimization objectives of selling hamburgers. As an example of illustrating content generation, the set of rules for generating content with the objectives of selling hamburgers are listed in Table 2.

TABLE 2

| Rules |
| --- |
| Content element type A (visual representation of a hamburger) must be included; |
| Content element type B (visual representation of a beverage) can be included; |
| Content element type C (visual representation of French fries) can be included; |
| Content element type D (promotional phrase) must be included; |
| Content element of type A is on the left of Content element of type B or type C. |

Based on the rules in Table 2, a rule-based content generation system can create three exemplary content configurations in Table 3. A content configuration can be expressed as a vector. The vector can include identifiers of a set of content elements and categorical relationships among the content elements expressed in a series of operators. In an exemplary embodiment, each operator can describe the relationships in sequential order. For example, BELOW(element x, element y) would place element y below element x, and RIGHT(element x, element y, element z) would place element y to the right of element x, and element z to the right of element y. Relative size operators can function similarly. For example, LARGER(element x, element y) may mean element y is larger than element x. Operators may also describe relative orientations of content elements. For example, PARALLEL(element x, element y) may mean that element x is parallel to element y. Metric adjustment can be also included in the vector. For example, (x, y) can describe adjustment with pixels as unit in (x, y) metric space. As illustrated in the vector for Content 3 in Table 3, the visual representation of the drink will be shifted to the right by 100 pixels and upwards 50 pixels relative to the position of the visual representation of the burger.

TABLE 3

| Content | Vector |
| --- | --- |
| Content 1 | BELOW(phrase, burger) |
|  | BELOW(phrase, drink) |
|  | RIGHT(burger, drink) |

TABLE 3-continued

| Content | Vector |
|---|---|
| Content 2 | LARGER(phrase, burger)<br>PARALLEL(phrase, burger, drink)<br>BELOW(phrase, burger)<br>BELOW(phrase, drink)<br>RIGHT(burger, drink (+100, +50)) |
| Content 3 | LARGER(phrase, burger)<br>PARALLEL(phrase, burger, drink)<br>BELOW(burger, phrase)<br>BELOW(fries, phrase)<br>RIGHT(burger, fries)<br>LARGER(phrase, burger)<br>PARALLEL(phrase, burger, fries) |

As a further example, Content 1 in Table 3 is assembled into a content illustrated in FIG. 9A and Content 3 in Table 3 is assembled into a content illustrated in FIG. 9B. A rule-based content optimization system can further evaluate the performance of these two pieces of content and potentially update the set of rules for content generation based on the content performance data. Between FIGS. 9A and 9B, the visually important differences are the location of content element 902 relative to the other content elements 904 and 906/908, and the replacement of content element 906, illustrating a visual representation of a beverage, with content element 908, illustrating a visual representation of French fries. In this example, once an experiment is conducted to identify the content performance associated with each piece of content, the optimization system can identify several possible sources of the differences in performance. In the example of FIGS. 9A and 9B, there are several potential visually important differences between the two pieces of content. The differences in content performance could be due to the substitution of content element 906 for 908, or the change in position of content element 902. Experiments with other permutations involving the position of 902 and the relative effectiveness of 906 and 908 may further identify the source of differences in content performance, by supplying more extensive data on the impacts of different content configurations and allowing for statistical isolation of a content element or relationship's impact among a diverse set of content configurations. Additional content performance data can also be used to identify higher-order effects, such as synergistic effects of sets of relationships (i.e., the impact of the position of content element 902 below the other content elements), selection of content element (i.e., selecting content element 906 other than content element 908), or combinations of relationships and/or content elements, or other effects. For example, based on the content performance data, the content optimization system can add a rule that Content element type C (visual representation of French fries) should be excluded, or add a rule that Content element type D (promotional phrase) should be on the left of Content element type A (visual representation of a hamburger).

In some embodiments, a set of rules on content generation can be updated by the system to reflect the data collected during content testing. Table 4 provides pseudo code for an exemplary embodiment of rule modification and improvement. The search space is initially narrowed both by user input and the nature of the content element and categorical relationship structure, allowing all initially permissible configurations of content to be tested. Next, the successful several configurations can be selected and the set of rules governing content generation can be modified based on the selection. Further, the successful configurations can have additional testing. Optionally, the additional testing can include different metric adjustments within the categorical relationships of those successful configurations. The metric adjustments are made by starting with an approved set of content elements and relationships, and determining adjustments to test. The adjustments may also be audited to ensure that they remain within the established categorical relationships, or the metric adjustments may be selected from a range known to maintain those categorical relationships, and not to move any element outside the boundaries of the display. The metric adjustments are then tested for each of the selected content configurations and from that pool. Experimental data can be obtained for the adjusted pieces of contents. Again, the successful configurations including metric adjustments are selected, and the rules governing content generation are adjusted to eliminate less successful configurations and metric adjustments. Metric adjustments may optionally be further improved through use of one or more of the known prediction and improvement algorithms, which may draw data from experiments on different metric adjustments and use that data to identify different metric adjustments to test.

TABLE 4

Rule Modification Pseudo Code

Figure 10A:
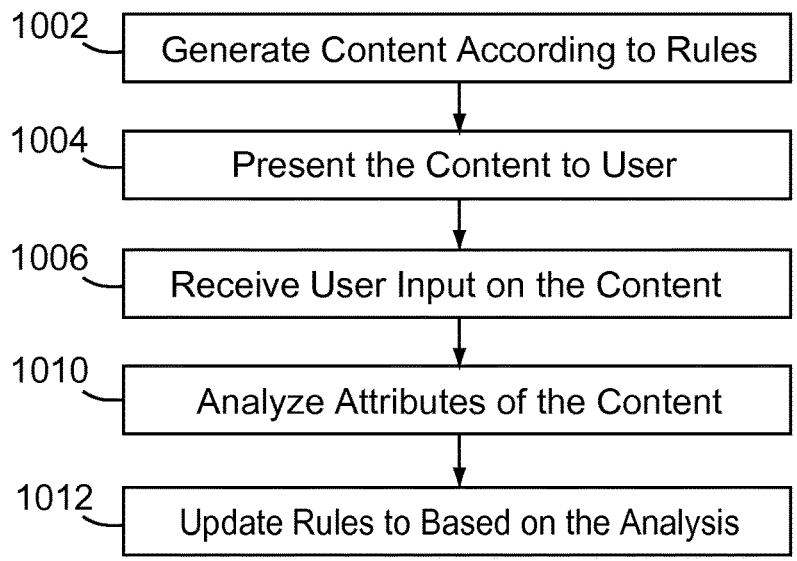
FIG. 10A provides an exemplary flowchart detailing the rules development process facilitated by user inputs via a user interface.

Modify Rule ( )
  Receive content performance data for content generated based on a set of
  rules on content elements and permissible relationships among the elements
  Select the pieces of content producing successful results according to the
  experimental data.
  Modify the set of rules based on the selected pieces of content
  Apply metric adjustments to the selected pieces of content
  Receive content performance data for the pieces of content with metric adjustment
  Select the adjusted pieces of content successful results according to the
  experimental data.
  Further modify the set of rules based on the adjusted pieces of content
Metric Adjustment( )
  Select one of the successful pieces of content
  Select metric adjustments to be made to the piece of content
    Ensure that metric adjustments will not cause content elements to
    cross categorical boundaries or content boundaries
  Apply metric adjustments to that piece of content by moving content
  elements according to the adjustments.
  Repeat until each piece of content has been selected and adjusted Creating initial rules and/or manual modification to rules may be undertaken by way of a user interface on an electronic display device, wherein the user is presented with content and then makes a decision regarding whether the content is acceptable or not. Rules can also be automatically updated based on data from tests of various configurations of content. In some embodiments, a content optimization system can include a user interface allowing users to provide or select rules governing permissible relationships among content elements and a processor to generate content, where the processor arranges content elements according to the rules. FIG. 10A provides an exemplary flowchart detailing the rules development process facilitated by user inputs via a user interface. First, a piece of potential content is generated according to the initial set of rules (step 1002). The initial set of rules can be generated with or without user inputs, such as the type of content, the content objective, or the like. The piece of potential content is then presented to the user via the user interface (step 1004). Next, user input can be provided via an input device (step 1006). The user input can be in the form of either an approval or rejection of the presented piece of content. After user input is taken, the system compares the attributes of the potential content to the current set of rules (step 1008). Based on these comparisons, the system can analyze which attributes of the piece of potential content contributed to the decision (step 1010). The rules are updated based on the analysis (step 1012). For example, the system can generate or modify rules to exclude attributes that are sufficiently certain to lead to rejection. Optionally, the system may identify content attributes that require additional review, and ensure inclusion of permutations of those attributes in subsequent potential content configurations.

Figure 10B:
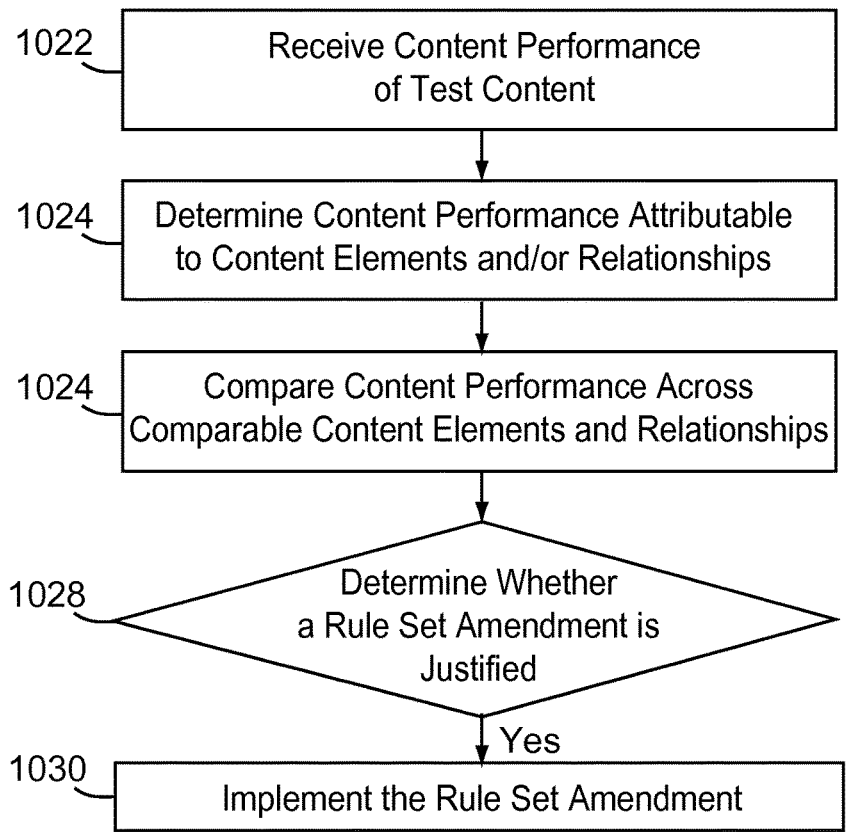
FIG. 10B is an exemplary logical flowchart detailing automated rules development based on content performance.

FIG. 10B is an exemplary flowchart detailing automated rules development based on content performance. A content optimization system can optimize content for a particular objective. The content optimization system receives content performance of test content (step 1022). The test content can be denoted as content configurations that include content elements and relationships among the content elements. The system determines content performance attributable to content elements and relationships, which are also referred to as content attributes (step 1024). Optionally, the system can compare content performance across comparable content elements and relationships (step 1026). Comparable content elements may be defined through metadata concerning the nature or purpose of the content element, derived from the similarity of the relationships among the content elements, or otherwise determined, such as by user input. The comparisons are then fed into a rules generation algorithm that, depending on the comparisons, determines whether the information is sufficient to justify a rule set amendment (step 1028). If it is justified, the system can implement the rule set amendment (step 1030). Amendments to the rules can include the exclusion of content elements and relationships that are found to be inferior to other comparable elements and relationships, but may also be adjustments to the frequency with which certain content elements or relationships are used, or other alterations that influence the typical form of the content generated. The determination of whether an amendment is justified is based on the certainty regarding the compared effectiveness metrics, as well as the system used to identify and implement the rules updates, for example, identification of Pareto improvements, use of prediction engines, known optimization algorithms, or individual incremental improvements.

Figure 10C:
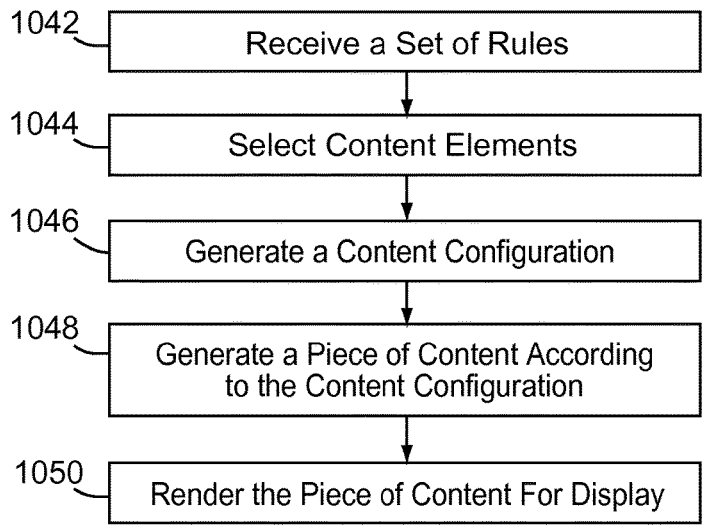
FIG. 10C illustrates an exemplary logical flowchart for content generation based on rules governing relationships among content elements.

FIG. 10C illustrates an exemplary flowchart for content generation based on rules governing relationships among content elements. Steps of this flowchart may be implemented on a single computer at one site or may be distributed across a series of networked computers. For example, the first three steps can be implemented on a central server, while the assembly of content elements and rendering are implemented on computer(s) at a separate location. First, the rule set is received (step 1042). The rule set provided may optionally be selected or generated based on a specific goal the content is directed to. Then, the set of content elements to be used in the content are selected according to the rules (step 1044). The rules may include both mandatory content elements that must be present in a piece of content, as well as content elements that are optional, and content elements that are excluded from the piece of content. In some case, the rules may also govern which optional content elements may appear together, or specific optional content elements that must be included or excluded based on specific selections from the required content elements. In some embodiments, a content element may be categorized through metadata descriptive of the content element or its purpose, and the rules or content configurations may refer to this metadata. After the content elements are selected, the system generates a content configuration including a set of categorical relationships among the content elements based on the set of rules (step 1046). Optionally, the content configuration can further include metric adjustments. A content generation system can generate a piece of content by placing the content elements according to the content configuration (step 1048). This can be done in several ways. In some implementations, the centroids of each content element are calculated and used as the reference points, by which each content element is placed in the center of its various categorical relationships (i.e. diagonal arrangements can be at a 45 degree angle from horizontal arrangements). In some other implementations, a logistic function may be used to place content elements according to the categorical relationships. In some cases, the generation of content also includes steps of placing content elements according to metric adjustments specified in the content configuration. Optionally, once the content elements have been arranged according to the categorical relationships, the content generation system can audit the arranged content to ensure that the content will fit specific display dimensions or categories. Once the content generation and optional display testing are complete, the content is rendered for display (step 1050).

Figure 11:
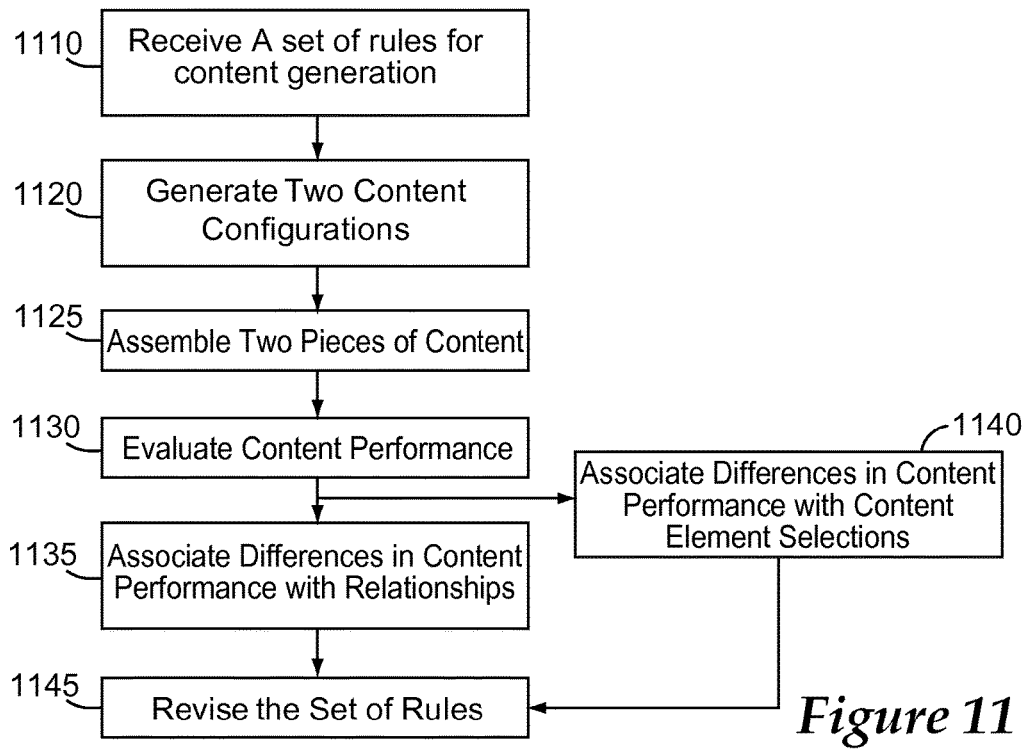
FIG. 11 illustrates a logical flowchart for an exemplary embodiment directed to rule-based content optimization systems for digital signage networks.

FIG. 11 illustrates a logical flowchart for an exemplary embodiment directed to rule-based content optimization systems for digital signage networks. Initially, a set of rules governing content generation for certain optimization objectives are retrieved (step 1110). The rules can be retrieved from a data repository or received from user input or network commands and a combination thereof. A processing unit creates two content configurations (step 1120), by selecting a set of content elements and defining categorical relationships among the set of selected content elements, and optionally defining metric adjustments among the set of selected content elements within the categorical relationships, in accordance with the set of rules. The two content configurations are designed to reach certain optimization objectives, for example, to influence particular behavior(s). The system further assembled two pieces of content based on the two content configurations (step 1125). For digital signage networks, the rendering step may be completed either at a remote location from a display, where the assembled content is transferred to displays on the network, or at a local location of a display, where a piece of content is assembled by a computing device with a local content element repository in accordance with the content configuration. Optionally, the rendering step may include an additional step of making metric adjustments to the positions of the content elements, where the metric adjustments are typically within the boundaries of categorical relationship(s) specified by the content configuration.

Next, the performance of the two pieces of content in reaching the optimization objectives can be evaluated (step 1130). In some embodiments, experiments are typically done by allocating content to specific time periods in a manner that carryover effects and related confounds are reduced in the measurements of content performance. In some implementations, experiments are typically done in a way that ensures an appropriate amount of display duration to generate a statistically valid sample. Content performance can be evaluated based upon data collected during a time period when the content is likely viewed. In some cases, the collected data can be pre-processed to reduce confounds before it is used in content evaluation.

Further, the differences in content performance can be associated with relationships (step 1135) and/or content element selections (step 1140). In some cases, additional data regarding content performance in reaching the optimization objectives can optionally be used to supplement the analysis of the two content configurations, for example, assisting in associating the effectiveness of content with particular content elements or relationships among content elements. The set of rules for content generations for reaching the optimization objectives can be revised based upon the association step(s) (step 1145). For example, the system can revise the set of rules by adding a rule of excluding some content elements, a rule of excluding some content elements and relationships combinations, or a rule of relationships among two or more content elements. In another example, the system can revise the set of rules by revising an existing rule of permissible categorical relationships among content elements, an existing rule of permissible metric positions for content elements, or the like. Such embodiments can improve and optimize content by amending the rules to eliminate less effective options from the potential search space and focus on the more effective potential configurations.

In an exemplary embodiment, if the analysis shows that one content element has better performance than another content element (such as content element 906 always producing superior responses to 408, from the examples of content in FIGS. 9A and 9B), the optimization system can amend the rules to include the content element with better performance but not the content element with inferior performance. In some cases, the amending of the rules may also include metric adjustments to the positions of content elements within specific categorical boundaries identified. In some embodiments, rules governing permissible categorical relationships among content elements are optimized before rules governing permissible metric positions of content elements are adjusted. In some other cases, rules may also be developed by a prediction engine that identifies areas of content elements and relationships most likely to be successful based on the collected data, then creates or adjusts rules that focus on those areas. The prediction engine can use algorithms based on a variety of known statistical means of prediction or known optimization methods, for example, reinforcement learning routines, logistic regression routines, neural networks, supervised or unsupervised learning routines, transduction, genetic algorithms, support vector routines, learning-to-learn routines, or the like. By focusing on successful area in the search space, the system can explore content configurations effectively in optimizing content.

In an exemplary embodiment directed to generating and optimizing content in internet applications, the content generation and rendering steps can be similar to the optimization systems for digital signage networks. Content performance can be evaluated based upon data collected when the content is displayed. The collected data can be, for example, data indicative of behavior of viewers of content, data related to click behavior, or the like. In some implementations, data can be collected when content is displayed in according with an experiment design. In some cases, the experiment can be conducted by distributing the assembled pieces of content to similar advertising opportunities appearing on websites, which may be similar in a variety of dimensions such as overall page layout, the profile of website visitors, and other variables. In some implementations, the relative content effectiveness can be adjusted to account for differences in the population of advertising opportunities. When the content performance is evaluated, the association steps and the revising step can be similar to these steps for embodiments of the rule-based content optimization systems for digital signage networks as described above.

EXEMPLARY EMBODIMENTS

Embodiment One

A system, comprising:
a rule management module adapted to receive a plurality of rules on content generation; and
a content generation module coupled to the rule management module and adapted to generate a content configuration, the content configuration comprising a plurality of content elements and one or more relationships among the plurality of content elements, wherein the plurality of rules comprises rules on relationships and the one or more relationships are in accordance with the plurality of rules, the content configuration operable to be assembled to a piece of content,
wherein at least one of the plurality of content elements has more than one allowable position in the assembled piece of content.

Embodiment Two

The system of Embodiment One, further comprising:
an assembling module adapted to assemble the content configuration to a piece of content by arranging the plurality of content elements according to the one or more relationships.

Embodiment Three

The system of Embodiment One, further comprising:
a transmitter adapted to send the content configuration via a connection.

Embodiment Four

The system of Embodiment One, further comprising:
a receiver adapted to receive the content configuration.

Embodiment Five

The system of Embodiment Four, further comprising:
an assembling module adapted to assemble the content configuration as a piece of content by arranging the plurality of content elements according to the one or more relationships.

Embodiment Six

The system of Embodiment One, wherein the plurality of rules further comprises rules on content elements.

Embodiment Seven

The system of Embodiment One, wherein the plurality of rules further comprises rules on metric adjustments.

Embodiment Eight

The system of Embodiment One, wherein the plurality of rules further comprises rules on visual perception.

Embodiment Nine

The system Embodiment Two, further comprising:
a visual attention model (VAM) evaluator adapted to apply a VAM on the assembled piece of content to generate a VAM output and determine if the assembled piece of content satisfies the plurality of rules based on the VAM output.

Embodiment Ten

The system of any one of the preceding Embodiments, wherein at least one of the plurality of rules is based upon at least one of factors comprising inventory data, point-of-sale data, locality, and day-part.

Embodiment Eleven

The system of any one of the Embodiment One through Nine, wherein the content configuration further comprises a metric adjustment of one of the plurality of content elements.

Embodiment Twelve

A system, comprising:
a content element repository adapted to store content elements; and
an assembling module adapted to receive a content configuration comprising a plurality of content elements and one or more relationships among the plurality of content elements, the one or more relationships in accordance with a plurality of rules on content generation,
wherein the assembling module is further adapted to assemble a piece of content based on the content configuration by arranging the plurality of content elements according to the one or more relationships.

Embodiment Thirteen

The system of Embodiment Twelve, wherein the content configuration further comprises a metric adjustment of one of the plurality of content element, and wherein the assembling unit is further adapted to assemble the piece of content by arranging the one of the plurality of content elements according to the metric adjustment.

Embodiment Fourteen

The system of Embodiment Twelve, wherein the assembling module is further configured to assemble the piece of content according to characteristics of a target display.

Embodiment Fifteen

The system of Embodiment Twelve, wherein the plurality of rules comprises rules on relationships.

Embodiment Sixteen

The system of Embodiment Twelve, wherein the plurality of rules comprises rules on content elements.

Embodiment Seventeen

The system of Embodiment Thirteen, wherein the plurality of rules further comprises rules on metric adjustments.

Embodiment Eighteen

The system of Embodiment Twelve, wherein the plurality of rules further comprises rules on visual perception.

Embodiment Nineteen

The system of Embodiment Twelve, further comprising:
a visual attention model (VAM) evaluator adapted to apply a VAM on the assembled piece of content to generate a VAM output and determine if the assembled piece of content satisfies the plurality of rules based on the VAM output.

Embodiment Twenty

The system of any one of the Embodiment Twelve through Embodiment Nineteen, wherein at least one of the plurality of rules is based upon at least one of factors comprising inventory data, point-of-sale data, locality, day-part and trigger data.

Embodiment Twenty-One

A method for content generation, comprising:
receiving a plurality of rules on content generation; and
generating, by a processor, a content configuration comprising a plurality of content elements and one or more relationships among the plurality of content elements, the content configuration operable to be assembled to a piece of content, wherein the plurality of rules comprises rules on relationships among content elements, wherein the one or more relationships are in accordance with the plurality of rules,
wherein at least one of the plurality of content elements has more than one allowable position in the assembled piece of content.

Embodiment Twenty-Two

The method of Embodiment Twenty-one, further comprising:
assembling, by a processor, the content configuration to a piece of content by arranging the plurality of content elements according to the one or more relationships.

Embodiment Twenty-Three

The method of Embodiment Twenty-one, wherein the plurality of rules further comprises rules on content elements.

Embodiment Twenty-Four

The method of Embodiment Twenty-one, wherein the plurality of rules further comprises rules on metric adjustments.

Embodiment Twenty-Five

The method of Embodiment Twenty-one, wherein the plurality of rules further comprises rules on visual perception.

Embodiment Twenty-Six

The method of Embodiment Twenty-two, further comprising:

applying, by a processor, a visual attention model (VAM) on the assembled piece of content to generate a VAM output and determine if the assembled piece of content satisfies the plurality of rules based on the VAM output.

Embodiment Twenty-Seven

The method of any one of the Embodiment Twenty-one through Embodiment Twenty-six, wherein at least one of the plurality of rules is based upon at least one of factors comprising inventory data, point-of-sale data, locality, and day-part.

Embodiment Twenty-Eight

The method of any one of the Embodiment Twenty-one through Embodiment Twenty-six, wherein the content configuration further comprises a metric adjustment of one of the plurality of content elements, wherein the assembling step comprises arranging the one of the plurality of content elements according to the metric adjustment.

Embodiment Twenty-Nine

A method, comprising:
receiving a content configuration comprising a plurality of content elements and one or more relationships among the plurality of content elements, the one or more relationships in accordance with a plurality of rules on content generation; and
assembling, by a processor, a piece of content based on the content configuration by arranging the plurality of content elements according to the one or more relationships.

Embodiment Thirty

The method of Embodiment Twenty-nine, wherein the content configuration further comprises a metric adjustment of one of the plurality of content element, and wherein the assembling step comprises assembling the piece of content by arranging the one of the plurality of content elements according to the metric adjustment.

Embodiment Thirty-One

The method of Embodiment Twenty-nine or Thirty, wherein the assembling step comprises assembling the piece of content according to characteristics of a target display.

Embodiment Thirty-Two

The method of Embodiment Twenty-nine, wherein the plurality of rules comprises rules on relationships.

Embodiment Thirty-Three

The method of Embodiment Twenty-nine, wherein the plurality of rules comprises rules on content elements.

Embodiment Thirty-Four

The system of Embodiment Twenty-nine or Thirty, wherein the plurality of rules further comprises rules on metric adjustments.

Embodiment Thirty-Five

The method of Embodiment Twenty-nine, wherein the plurality of rules further comprises rules on visual perception.

Embodiment Thirty-Six

The method of Embodiment Twenty-nine, further comprising:
applying, by a process, a visual attention model (VAM) on the assembled piece of content to generate a VAM output and determine if the assembled piece of content satisfies the plurality of rules based on the VAM output.

Embodiment Thirty-Seven

The method of Embodiment Twenty-nine, wherein at least one of the plurality of rules is based upon at least one of factors comprising inventory data, point-of-sale data, locality, day-part, and trigger data.

Embodiment Thirty-Eight

A method for optimizing content, comprising:
generating, by a processor, two content configurations, each content configuration comprising a plurality of content elements and one or more relationships among the plurality of content elements, the one or more relationships in accordance with a set of rules defining permissible relationships;
assembling, by a processing unit, the two content configurations to two pieces of content;
conducting an experiment to obtain effectiveness data of the two pieces of content on reaching an optimization objective; and
determining relative effectiveness of the two content configurations based on the effectiveness data.

Embodiment Thirty-Nine

The method of Embodiment Thirty-eight, further comprising:
associating the relative higher effectiveness of one content configuration to a relationship that is different in the two content configurations.

Embodiment Forty

The method of Embodiment Thirty-nine, further comprising:
generating a rule on the relationship based upon the one content configuration having relative higher effectiveness.

Embodiment Forty-One

The method of Embodiment Thirty-eight, further comprising:
selecting a rule from the set of rules, the rule related to the relationship;
modifying the rule based upon the one content configuration having relative higher effectiveness.

Embodiment Forty-Two

The method of Embodiment Thirty-eight, further comprising:

associating the relative higher effectiveness of one content configuration to a content element that is different in the two content configurations.

Embodiment Forty-Three

The method of Embodiment Forty-two, further comprising:
generating a rule on the content element based upon the one configuration of the plurality of content elements having relative higher effectiveness.

Embodiment Forty-Four

The method of Embodiment Forty-two, further comprising:
selecting a rule from the set of rules, the rule related to the content element;
modifying the rule based upon the one configuration of content elements having relative higher effectiveness.

Embodiment Forty-Five

The method of Embodiment Thirty-eight, wherein at least one of the two content configurations comprises a metric adjustment of one of the plurality of content elements.

Embodiment Forty-Six

The method of Embodiment Forty-five, further comprising:
associating the relative higher effectiveness of one content configuration to the metric adjustment.

Embodiment Forty-Seven

The method of Embodiment Forty-six, further comprising:
generating a rule on the metric adjustment based upon the one configuration of the plurality of content elements having relative higher effectiveness.

Embodiment Forty-Eight

The method of any one of the Embodiment Thirty-eight through Embodiment Forty-six, further comprising:
selecting a rule from the set of rules, the rule related to the metric adjustment;
modifying the rule based upon the one configuration of content elements having relative higher effectiveness.

Embodiment Forty-Nine

The method of any one of the Embodiment Thirty-eight through Embodiment Forty-eight, further comprising:
generating a rule on visual perception based on the optimization objective.

Embodiment Fifty

The method of Embodiment Forty-nine, further comprising:
applying a VAM, by a processing unit, to at least one of the two pieces of content to generate a VAM output; and
determining if the at least one of the two pieces of content satisfies the rule on visual perception based on the VAM output.

Embodiment Fifty-One

The method of any one of the Embodiment Thirty-eight through Embodiment Forty-eight, further comprising:
generating a rule based upon at least one of factors comprising inventory data, point-of-sale data, locality, day-part, and trigger data.

Embodiment Fifty-Two

The method of any one of the Embodiment Thirty-eight through Embodiment Forty-eight, further comprising:
modifying a rule based upon at least one of factors comprising inventory data, point-of-sale data, locality, day-part, and trigger data.

Embodiment Fifty-Three

A content optimization system, comprising:
a content generation module adapted to generate a content configuration, the content configuration comprising a plurality of content elements and one or more relationships among the plurality of content elements, the one or more relationships in accordance with a set of rules on content generation, the content configuration designed with a particular optimization objective;
a content evaluator adapted to evaluate content performance on reaching the particular optimization objective based on data acquired when a piece of content assembled from the content configuration is displayed; and
a rule management module adapted to amend the set of rules based on the evaluated content performance.

Embodiment Fifty-Four

The content optimization system of Embodiment Fifty-three, wherein the rule management module is adapted to amend the set of rules by at least one of the steps of adding a rule on a relationship and modifying a rule on a relationship.

Embodiment Fifty-Five

The content optimization system of Embodiment Fifty-three or Fifty-four, wherein the set of rules comprises at least one of rules on relationships, rules on content elements, rules on metric adjustments, and rules on visual perception.

Embodiment Fifty-Six

The content optimization system of Embodiment Fifty-three, wherein the rule management module is adapted to amend the set of rules by at least one of the steps of adding a rule on content elements and modifying a rule on content elements.

Embodiment Fifty-Seven

The content optimization system of Embodiment Fifty-three, wherein the content configuration further comprises a metric adjustment of a content element.

Embodiment Fifty-Eight

The content optimization system of the Embodiment Fifty-seven, wherein the rule management module is adapted to amend the set of rules by at least one of the steps of adding a rule regarding a metric adjustment of the content element and modifying a rule regarding a metric adjustment of the content element.

Embodiment Fifty-Nine

The content optimization system of Embodiment Fifty-three, wherein the evaluated content performance comprises at least one of data indicative of activities at a location where the piece of content is displayed, data indicative of view behavior, and result from a visual attention model.

Embodiment Sixty

The content optimization system of Embodiment Fifty-three, wherein the rule management module is adapted to amend the set of rules by at least one of the steps of adding a rule on visual perception based on the particular optimization objective and modifying a rule on visual perception based on the particular optimization objective.

Embodiment Sixty-One

The content optimization system of Embodiment Fifty-three, further comprising:
a visual attention model (VAM) evaluator adapted to apply a VAM on the assembled piece of content to generate a VAM output and determine if the assembled piece of content satisfies the set of rules based on the VAM output.

Embodiment Sixty-Two

The content optimization system of any one of the Embodiment Fifty-three through Embodiment Sixty-one, the rule management module is adapted to amend the set of rules by adding a rule or modifying a rule based upon at least one of factors comprising inventory data, point-of-sale data, locality, day-part, and trigger data.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A computer-implemented system for facilitating automatic content generation, comprising:
a rule management module adapted to receive a plurality of rules on content generation, wherein at least one of the plurality of rules is based upon at least one of factors comprising inventory data, point-of-sale data, locality, and day-part; and
a content generation module coupled to the rule management module and adapted to generate a content configuration, the content configuration comprising a plurality of content elements and one or more relationships among the plurality of content elements, wherein the plurality of rules comprises rules on relationships and the one or more relationships are in accordance with the plurality of rules, the content configuration operable to be assembled to a piece of content,
wherein at least one of the plurality of content elements has more than one allowable position in the assembled piece of content,
a visual attention model (VAM) evaluator that simulates neurological processes and psychological effects in a biological visual system, the VAM evaluator adapted to apply a VAM on the assembled piece of content to generate a VAM output and determine if the assembled piece of content satisfies the plurality of rules based on the VAM output, and
wherein the rule management module and content generation module are stored on a computer readable storage medium.

2. The system of claim 1, further comprising:
an assembling module adapted to assemble the content configuration to a piece of content by arranging the plurality of content elements according to the one or more relationships.

3. The system of claim 1, wherein the plurality of rules further comprises rules on content elements, rules on metric adjustments, or rules on visual perception.

4. The system of claim 1, wherein the content configuration further comprises a metric adjustment of one of the plurality of content elements.

5. A system, comprising:
a content element repository adapted to store content elements; and
an assembling module adapted to receive a content configuration comprising a plurality of content elements and one or more relationships among the plurality of content elements, the one or more relationships in accordance with a plurality of rules on content generation, wherein at least one of the plurality of rules is based upon at least one of factors comprising inventory data, point-of-sale data, locality, and day-part;
wherein the assembling module is further adapted to assemble a piece of content based on the content configuration by arranging the plurality of content elements according to the one or more relationships; and
a visual attention model (VAM) evaluator that simulates neurological processes and psychological effects in a biological visual system, the VAM evaluator adapted to apply a VAM on the assembled piece of content to generate a VAM output and determine if the assembled piece of content satisfies the plurality of rules based on the VAM output.

6. The system of claim 5, wherein the content configuration further comprises a metric adjustment of one of the plurality of content element, and wherein the assembling unit is further adapted to assemble the piece of content by arranging the one of the plurality of content elements according to the metric adjustment.

7. The system of claim 5, wherein the assembling module is further configured to assemble the piece of content according to characteristics of a target display.

8. The system of claim 5, wherein the plurality of rules comprises rules on relationships, rules on content elements, rules on metric adjustments, or rules on visual perception.

9. A method for content generation, comprising:
receiving a plurality of rules on content generation, wherein at least one of the plurality of rules is based upon at least one of factors comprising inventory data, point-of-sale data, locality, and day-part; and
generating, by a processor, a content configuration comprising a plurality of content elements and one or more relationships among the plurality of content elements, the content configuration operable to be assembled to a piece of content, wherein the plurality of rules comprises rules on relationships among content elements, wherein the one or more relationships are in accordance with the plurality of rules, wherein at least one of the plurality of content elements has more than one allowable position in the assembled piece of content; and evaluating, by a visual attention model (VAM) evaluator that simulates neurological processes and psychological effects in a biological visual system applying a VAM on the assembled piece of content to generate a VAM output and determine if the assembled piece of content satisfies the plurality of rules based on the VAM output.

10. The method of claim 9, further comprising:

assembling, by a processor, the content configuration to a piece of content by arranging the plurality of content elements according to the one or more relationships.

11. The method of claim 9, wherein the plurality of rules further comprises rules on content elements, rules on metric adjustments, or rules on visual perception.

12. The method of claim 9, wherein the content configuration further comprises a metric adjustment of one of the plurality of content elements, wherein the assembling step comprises arranging the one of the plurality of content elements according to the metric adjustment.

* * * * *